(12) United States Patent
Barrett et al.

(10) Patent No.: US 8,969,229 B2
(45) Date of Patent: Mar. 3, 2015

(54) GAS SEPARATION ADSORBENTS AND MANUFACTURING METHOD

(75) Inventors: Philip Alexander Barrett, Tonawanda, NY (US); Neil Andrew Stephenson, E. Amherst, NY (US); Steven John Pontonio, Eden, NY (US); Jian Zheng, Williamsville, NY (US)

(73) Assignee: Praxair Technology, Inc., Danbury, CT (US)

( * ) Notice: Subject to any disclaimer, the term of this patent is extended or adjusted under 35 U.S.C. 154(b) by 1678 days.

(21) Appl. No.: 12/445,685

(22) PCT Filed: Oct. 22, 2007

(86) PCT No.: PCT/US2007/082087
§ 371 (c)(1),
(2), (4) Date: Sep. 15, 2009

(87) PCT Pub. No.: WO2008/051904
PCT Pub. Date: May 2, 2008

(65) Prior Publication Data
US 2014/0094359 A1    Apr. 3, 2014

Related U.S. Application Data

(60) Provisional application No. 60/853,154, filed on Oct. 20, 2006.

(51) Int. Cl.
| | | |
|---|---|---|
| B01J 35/10 | (2006.01) | |
| B01J 29/06 | (2006.01) | |
| B01J 29/18 | (2006.01) | |
| B01J 20/12 | (2006.01) | |
| B01J 20/30 | (2006.01) | |
| B01D 53/02 | (2006.01) | |
| B01D 53/04 | (2006.01) | |
| B01D 53/047 | (2006.01) | |
| B01J 20/18 | (2006.01) | |
| B01J 20/28 | (2006.01) | |

(52) U.S. Cl.
CPC ............. *B01J 20/305* (2013.01); *B01D 53/02* (2013.01); *B01D 53/04* (2013.01); *B01D 53/047* (2013.01); *B01J 20/183* (2013.01); *B01J 20/186* (2013.01); *B01J 20/28019* (2013.01); *B01J 20/2803* (2013.01); *B01J 20/28085* (2013.01); *B01J 20/3042* (2013.01); *B01J 20/12* (2013.01); *B01D 2253/108* (2013.01); *B01D 2253/30* (2013.01)
USPC ...... 502/9; 502/63; 502/75; 502/79; 502/407; 502/411

(58) Field of Classification Search
USPC ........................... 502/9, 63, 75, 79, 407, 411
See application file for complete search history.

(56) References Cited

U.S. PATENT DOCUMENTS

| | | | |
|---|---|---|---|
| 4,016,106 A | 4/1977 | Sawyer et al. | |
| 4,016,107 A | 4/1977 | Sawyer et al. | |
| 4,016,108 A | 4/1977 | Robson | |
| 4,081,405 A | 3/1978 | Sawyer | |
| 4,081,406 A | 3/1978 | Sawyer | |
| 4,316,819 A | 2/1982 | Tu et al. | |
| 5,932,509 A * | 8/1999 | Balse et al. | 502/65 |
| 6,090,738 A | 7/2000 | Choudary et al. | |
| 6,171,370 B1 | 1/2001 | Hirano et al. | |
| 6,425,940 B1 | 7/2002 | Chao et al. | |
| 6,497,750 B2 | 12/2002 | Butwell et al. | |
| 6,514,317 B2 | 2/2003 | Hirano et al. | |
| 6,652,626 B1 | 11/2003 | Plee | |
| 6,790,260 B2 | 9/2004 | Ackley et al. | |
| 2005/0119112 A1* | 6/2005 | Pfenninger et al. | 502/64 |
| 2005/0272594 A1* | 12/2005 | Weston et al. | 502/64 |

FOREIGN PATENT DOCUMENTS

| | | |
|---|---|---|
| JP | 3879456 B2 | 2/2007 |
| WO | WO2008/051904 A1 | 5/2008 |

OTHER PUBLICATIONS

LCI Technical Bulletins TB-GR-108 and 109, LCI Corp., P.O. Box 16348, Charlotte, NC 28297.
Handbook of Porous Solids, pp. 309-350, Ed. Feri Schuth, Kenneth S. W. Sing and Jens Weitkamp, ISBN 3-527-30246-8, Wiley Verlag GmbH, 2002.

* cited by examiner

*Primary Examiner* — Elizabeth Wood
(74) *Attorney, Agent, or Firm* — Salvatore P. Pace (57) ABSTRACT

The present invention generally relates to high rate adsorbents and a method for their manufacture involving the steps of component mixing, extrusion, spheronization and calcination. The component mixing can involve both dry mixing in addition to wet mixing of an adsorbent with a binder, if required, and a fluid such as water. The paste so formed from the mixing stage is extruded to produce pellets which are optionally converted to beads by spheronization using in one embodiment, a marumerizer. The product is harvested and calcined to set any binder or binders used and/or burn out any additives or processing aids. This basic manufacturing scheme can be augmented by extra processing steps including ion exchange and activation to alter the composition of the adsorbents, as required.

12 Claims, 7 Drawing Sheets

GAS SEPARATION ADSORBENTS AND MANUFACTURING METHOD

TECHNICAL FIELD

The present invention generally relates to high-rate gas separation adsorbents used in pressure swing adsorption (PSA), vacuum pressure swing adsorption (VPSA), and temperature swing adsorption (TSA) processes.

BACKGROUND OF THE INVENTION

Separations of a gas from admixture with other gases are important industrial processes. In such processes, the objective may be either to obtain a product gas enhanced in a particular gas or a product from which that particular gas as an undesired constituent has been removed. For example, there are commercial scale processes to separate air to obtain nitrogen, oxygen, hydrogen and argon.

Air separation can be accomplished using adsorption processes, in particular, pressure swing (PSA) and vacuum pressure swing types (VPSA). In PSA and VPSA processes, compressed air is pumped through a fixed bed of an adsorbent exhibiting an adsorptive preference for one of the main constituents whereby an effluent product stream enhanced in the non-adsorbed (or lesser adsorbed) constituent is obtained. Compared to cryogenic processes, adsorption processes for air separation require relatively simple equipment and are relatively easy to maintain. Adsorption processes, however, have lower product recovery and are typically less attractive than the cryogenic processes when the goal is to produce large volumes of product with very high purities. For these reasons, improvements in the adsorption processes remain important goals. One principal means of improvement is the discovery and development of better adsorbents.

One way to improve adsorption is to enhance the mass transfer rate of adsorbent materials, particularly those used in PSA and VPSA. With a fast mass transfer rate, one can have short cycle time and low power consumption and therefore high adsorbent productivity and high process efficiency in PSA/VPSA systems and processes. It has been recognized that it is possible to shorten cycle time by reducing particle size of adsorbent aggregates. This recognition has been based upon the assumption that the time needed for adsorbates to travel through the macropores of the agglomerated adsorbent particles limits the adsorption/desorption cycle time, i.e., macropore diffusion is the rate limiting step in adsorption processes.

U.S. Pat. No. 6,425,940 (Chao et al.) describes an improved adsorbent having a specific size-compensated relative rate (SCRR), which measures the effect of the intrinsic properties of the adsorbent (e.g., macropore diameter, macropore shape, macropore volume, macropore distribution) on the adsorption rate, and an air separation process using such adsorbents.

U.S. Pat. No. 4,016,106 (Sawyer et al.) and related U.S. Pat. No. 4,016,107 (Sawyer et al.), U.S. Pat. No. 4,016,108 (Robson), U.S. Pat. No. 4,081,405 (Sawyer), and U.S. Pat. No. 4,081,406 (Sawyer) (collectively, the "Sawyer/Robson patents") describe a forming process to make catalysts of group VI-B and/or group VIII metals dispersed on alumina supports which are prepared by a solution-based hydrogel method. These patents disclose a method of controlling the pore size distribution and pore volume of the alumina to generate a greater number of pores in size range 100-275 Å by use of the precipitated hydrogel and particularly the use of pore extending polymeric additives. The final pore volume, and pore volume distribution, of the finished alumina is principally determined by the amount of polymer or pore volume extender added to the hydrogel during the pore volume extending step. These patents also disclose a spray drying step to set the pore structure and convert the hydrogel to a boehmite phase. The catalyst composition can then be mulled to an extrudable paste and extruded to form extrudates, and if desired, marumerized to form spheres.

U.S. Pat. No. 6,514,317 (Hirano et al.) describes a beaded zeolite X composition which is useful for separation of hydrogen-based gas mixtures. A marumerizer was used to "dress" the beads which were formed by a blade agitation process. This patent does not teach extrusion for the formation pellets or strands of material which are converted to beads by a marumerizer/spheronizer.

U.S. Pat. No. 6,171,370 (Hirano et al.) describes a beaded zeolite X composition which is useful for air separation made by blade agitation granulation with the beads polished by a marumerizer, but does not disclose how to improve adsorption rate.

U.S. Pat. No. 4,316,819 (Tu et al.) discloses an aluminosilicate composition bound with an organic polymer which is agglomerated by extrusion and improved by spheronizing the shaped products before drying. Although U.S. Pat. No. 4,316,819 discloses the use of extrusion and spheronization to improve the properties of a zeolite (aluminosilicate), it is specifically for use in aqueous sugar separations. There are no teachings regarding making high rate adsorbents for gas separations and/or purifications where silicon dissolution is not an issue. Tu et al. demonstrate the benefits resulting from increasing the density of the adsorbent through spheronization. The teachings from the examples in U.S. Pat. No. 4,316,819 prefer more intense spheronization in regard to both speed and duration, which reflects the different adsorbent properties required for aqueous phase sugar separation than those required in gas phase separations.

Japanese Publication No. 2003055103 (Chisso Corporation) discloses a method for manufacturing agrochemicals wherein the components are mixed, extruded and thereafter converted into spherical particles using a marumerizer. Japanese Publication No. 2003055103 teaches producing particles with high sphericity which can be coated with agents for specific applications (including controlled release of chemicals agents and/or pharmaceutical drugs). Hence, the processing method and conditions are tailored to delivering particles with a highly spherical geometry, where the particles are suitable hosts for the target agents whose release is to be controlled. There is no discussion of high rate.

It would be desirable to make adsorbent beads with higher mass transfer rates compared to adsorbents produced by conventional bead forming processes at a given particle diameter. A method of making high rate adsorbents using an extrusion-spheronization process and more preferably using low pressure extrusion has not been described to date. Typically, adsorbent extrudates have been formed in high pressure extrusion processes and prior art does not indicate the use of low pressure extrusion.

Furthermore, in the past, extrusion-spheronization has been applied almost exclusively to the pharmaceutical and agrochemicals industries, and their agglomeration requirements and performance measures are quite different from those necessary or desirable for air separation processes.

SUMMARY OF THE INVENTION

The present invention generally relates to high rate adsorbents and a method for their manufacture involving the steps of component mixing, extrusion, spheronization and calcination. The component mixing can involve both dry mixing in addition to wet mixing of an adsorbent with a binder, if required, and a fluid such as water. The paste so formed from the mixing stage is extruded to produce pellets which are converted to beads by spheronization using in one embodiment, a marumerizer. The product is harvested and calcined to set any binder or binders used and/or burn out any additives or processing aids. This basic manufacturing scheme can be augmented by extra processing steps including ion exchange, caustic digestion, drying and activation to alter the composition of the adsorbents, as required. One embodiment of the present invention is a method of making a high rate adsorbent for gas separation comprising the steps of:

1. Component weighing or metering;
2. Component dry mixing;
3. Fluid addition and component wet mixing to form an extrudable paste;
4. Extrusion, preferably at low pressure to form extrudates;
5. Optional drying step to remove moisture primarily from the surface of the extrudates;
6. Optional spheronization of the extrudates to round and strengthen the particles and form adsorbent beads;
7. Drying and calcination of the shaped particles to remove any combustible additives and/or to set any binder or binders;
8. Optional steps including chemical modification, e.g., ion exchange and subsequent activation, can be performed at this stage; and
9. Packaging dry adsorbent product.

Although the extrudates made using the process of the present invention possess high adsorption rates, the spherical nature of the final beaded product are beneficial in applications where a high packed density is required and/or where attrition and fluidization are risks. The adsorbent beads produced by the method described herein possess high adsorption rates compared to similar sized beads of like composition from traditional forming processes (see e.g., U.S. Pat. No. 6,425,940 and/or U.S. Pat. No. 6,171,370).

Extruded and beaded adsorbents with high mass transfer rates are valued in many adsorption processes and purifications from the standpoint of increasing the overall process efficiency, and decreasing the cost of producing the target product when combined with appropriate process cycles and equipment in an adsorption system.

BRIEF DESCRIPTION OF THE DRAWINGS

For a more complete understanding of the present invention and the advantages thereof, reference should be made to the following Detailed Description taken in conjunction with the accompanying drawings in which:

FIGS. 7(a) and (b) are SEM images of cross-sections of sample B100.

DETAILED DESCRIPTION

Figure 1:
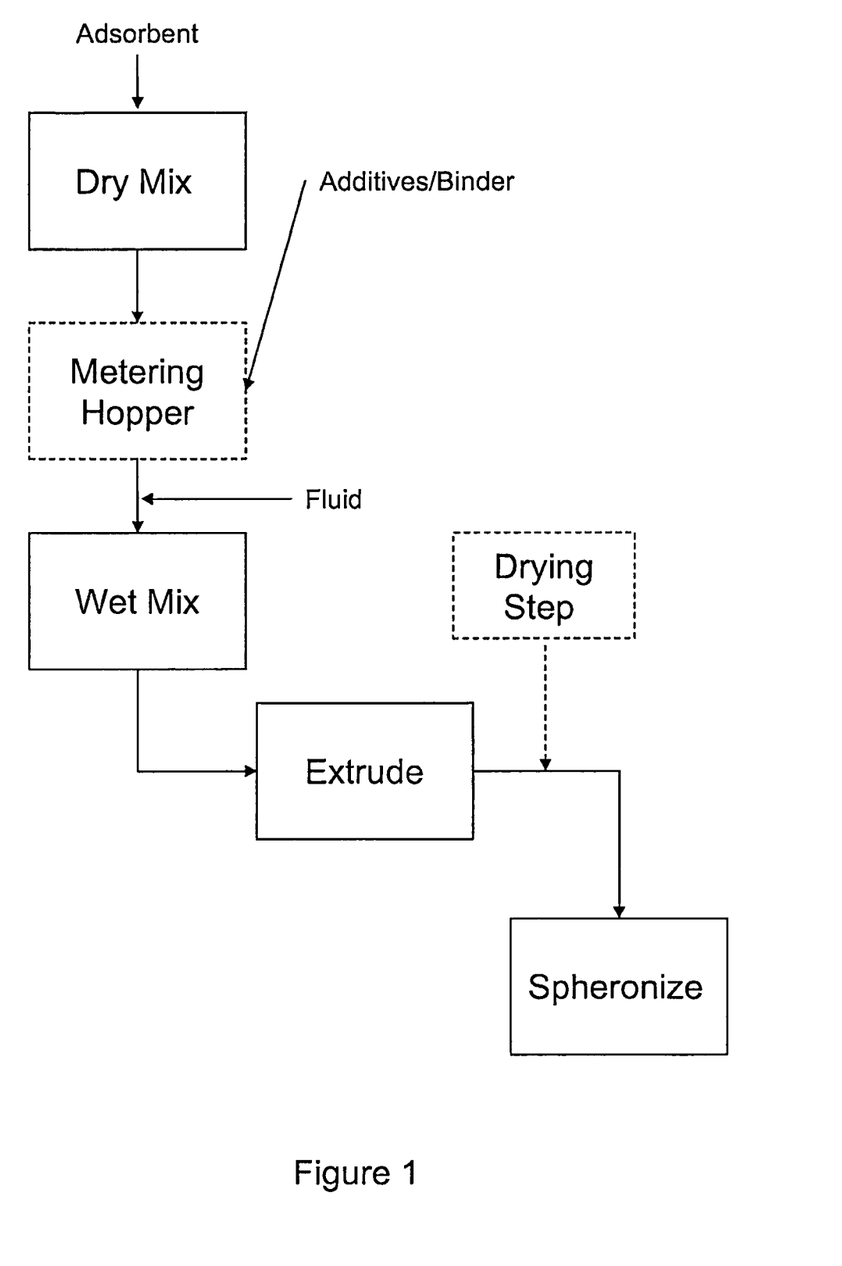
FIG. 1 is a schematic illustrating the core steps required to produce the adsorbents of the present invention.

Adsorbents with high mass transfer rates are made by a multi-step process beginning with a component mixing stage followed by extrusion and spheronization. The components comprise an adsorbent material (e.g., silica, alumina or zeolite), a binding agent (e.g., clays or inorganic oxides), and, optionally, processing additives such as lubricants, mixing aids, dispersal aids, porosity enhancers, and extrusion aids. The products are then calcined to strengthen the agglomerates, set any binding agents and remove any removable components used during the previous stages. For certain classes of adsorbent, additional processing stages may be required for example; an ion exchange step can be carried out on the calcined beads to modify their composition as required. The core steps involved in the production method are depicted in FIG. 1. As used herein, the term "SCRR" means the specific size-compensated relative rate as defined in U.S. Pat. No. 6,425,940. As used herein, the term "LiX2.0" means lithium ion exchanged zeolite of type X with a $SiO_2/Al_2O_3$ ratio of the zeolite about 2. This material is also referred to as LiLSX or low silica X by those skilled in the art. As used herein, the term "NaKX2.0" means zeolite of type X with a $SiO_2/Al_2O_3$ ratio of about 2 and containing sodium and potassium cations. This material is also referred to as zeolite X or low silica X or LSX. This product is obtained from direct synthesis using procedures and methods known by those skilled in the art. As used herein, the term "traditional forming" means bead making by equipment and methods other than extrusion-spheronization, e.g., Nauta bead formation described by Chao et al. in U.S. Pat. No. 6,425,940. As used herein, the term "like composition" means adsorbent material of same type (e.g., LiX2.0) and containing the same percentage of binder as measured on a dry basis (e.g., 10 wt %). As used herein, the term "binder" means an inorganic oxide having a lower adsorption capacity for the target gas or gases than the adsorbent component and used to hold agglomerated particles together such that there is sufficient crush strength for their intended application or applications. Acceptable binder materials include, but are not limited to, clays (e.g., attapulgite, sepiolite, Acti-Gel® 208) or alumina.

A. Mixing Stage

The primary purpose of the mixing stage is to prepare a paste which is suitable for extrusion. A secondary aim of the mixing stage is to blend all of the components together intimately and homogenously within the limits of the mixing equipment. The mixing stage is composed of either a dry mixing stage and a subsequent wet mixing stage or a single component blending process step. FIG. 1 illustrates one embodiment of the present invention, where the adsorbent, binder and processing additives are dry mixed for at least 30 minutes prior to any wet mixing. The metering hopper is present for convenience and is optional. A metering hopper is useful in an automated process or in a production line because it collects the dry mixed powder and allows it to be weighed or metered such that the correct amount of fluid is added for the wet mixing stage. However, any means for weighing the dry mixed powder and adding the target amount of fluid may be used in the present invention. Both low shear and high shear mixers can be employed for a dry mix stage. High shear mixing is useful to disperse components more intimately, especially at lower binder contents and additive levels. However, conventional low shear mixers are adequate for this purpose. The preferred type of mixer is one that blends all of the components together homogeneously and without causing any damage to any of the constituents, such as loss of crystallinity or excessive particle breakdown. Examples include, but are not limited to, simple low shear paddle mixers, with mixing speeds in the range 50-600 rpm, and preferably 140-300 rpm. After the dry mix is completed, a fluid, preferably water, is added in sufficient quantity to form an extrudable paste. Other fluids known in the art, such as organic solvents (e.g., ethanol) or lubricants (e.g., oils), may be used. The amount of water should be optimized on a case by case basis, since the water content appears to play a role in the formation of pores, especially macropores within the agglomerated product. Hence, the water content needs to be optimized for a given formulation to obtain both extrudable pastes and ultimately an agglomerated product with good porosity and mass transfer characteristics. Water content requires optimization based on the method of extrusion used. For example, in low pressure extrusion (less than 500 psi, and preferably less than 200 psi), the water content of the paste as determined by loss on ignition (LOI) at 1000° C. and expressed on a dry solids basis should be in the range 40-52 wt % and more preferably in the range 43-50 wt %. The paste must be dry enough so that it does not stick to the extruder, yet wet enough to hold the paste together to form extrudate. Pastes which are too wet to extrude can be dried until they are extrudable, although it is preferred that paste forming is achieved such that the paste is directly extrudable. The water quality is not limiting, provided no detrimental impurities or contaminants are introduced that would affect the adsorbent or any of the additives including the binder, if used, in a negative way. Additives help the yield which in the present case is defined as the percentage of material within the target size range, for example 10×20 mesh. The optimum additive concentration is that which achieves greater than 80% yield and more preferably greater than 90% yield after extrusion and/or spheronization. Possible additives include polyvinyl alcohol (PVA), methylcellulose (e.g., Methocel) and polyethylene glycol (PEG) added individually in contents up to 5 wt % and preferably 2 wt % and more preferably in the range 0.5 wt %-1.5 wt %.

A preferred embodiment of the present invention comprises the following steps in the mixing stage:
(a) combine inorganic oxide, preferably clay, and adsorbent (zeolite, alumina, silica or mixtures thereof) in approximately 90:10 proportions;
(b) add up to 3.5 wt % of additives selected from PVA, methylcellulose and PEG, more preferably up to 1.5 wt % of one or more of the above additives;
(c) mix in a low shear mixer (rotation speed 140-260 rpm for less than 60 minutes and optimally 15-30 minutes; and
(d) add fluid, preferably water, such that the LOI expressed on a dry solids basis is in the range 40-52 wt % preferably 43-50 wt % to make a paste which is directly extrudable, especially by a low pressure extruder (with pressure less than 500 psi).

Again, it is preferred that the mixing is carried out for less than 60 minutes, and preferably for 15-30 minutes, using a low shear paddle type mixer with rotation speed around 260 rpm.

B. Extrusion Stage

Once a suitable paste has been prepared from the mixing stage, this should be processed by extrusion to form pellets or strands of adsorbent. Extrusion dies between 0.5-3 mm are recommended and more preferably between 1-2 mm. Depending on the formulation, high or low pressure extrusion can be used although low pressure extrusion is particularly preferred in the context of producing products with good porosity and mass transfer characteristics. Maximum mass transfer characteristics are essentially set after the extrusion stage and further processing including marumerizing often has the effect of increasing the mass transfer resistance of the agglomerated particles. Hence, from the perspective of achieving beaded particles with high mass transfer rates, extrudates with high mass transfer rates must be produced firstly. Low pressure extrusion is viewed as an enabler to high rate extrudates (at a given particle diameter) without a reliance on the use of additives by virtue of its capability to produce extrudates with high porosity. For example, the pressure range for low pressure extrusion should be 30 to 500 psi in dome geometry (see LCI Technical Bulletin: Twin Dome Extruder Model TDG-110PA or TDG-80PB). Extrusion pressures significantly below 150 psi (e.g., below 100 psi, depending on the composition of the mixture) tend to give weak/loose extrudates which are not well marumerized; significantly higher pressures (e.g., above 1000 psi, depending on the composition of the mixture) tend to give compacted extrudates that easily break down in marumerizer and are less porous and offer slower adsorption rate properties (smaller SCRR values). However, additives to help both the extrusion and increase the porosity of the particles may be used. For example, small quantities (e.g., 0.5-5 wt %) of methylcellulose are found to be beneficial when extruding inorganic oxides including zeolites adsorbents and catalysts. During the development of a recipe (wherein the recipe includes composition and quantities of raw materials as well as extrusion processing type and conditions), the success of the extrusion phase can be gauged by characterizing the porosity using a technique such as Hg Porosimetry (see, e.g., *Handbook of Porous Solids*, pp. 309-350, Ed. Ferdi Schuth, Kenneth S. W. Sing and Jens Weitkamp, ISBN 3-527-30246-8, Wiley Verlag GmbH, 2002) and by performing adsorption rate tests using an appropriate method such as the breakthrough test described in U.S. Pat. No. 6,425,940 and/or U.S. Pat. No. 6,790,260. Generally, the mass transfer properties of the extruded product need to be greater than or equal to 100% of the target mass transfer rates for the spheronized product. The size range for extrudates should not be larger than 4.0 mm diameter and should not be smaller than 0.5 mm, wherein 1.0-1.5 mm is the preferred size range for particles exhibiting high adsorption rates and good crush strengths. Extrudates may be elongated strands that break naturally or are chopped into fixed lengths. A preferred embodiment of the present invention uses low pressure extrusion only where spheronization step is omitted and extrudates have SCRR greater than 2.0 mmol·mm$^2$/g/s, porosity greater than 48%, side crush strength greater than 0.7 lbf for particles at 1.5 mm extrudate diameter (where side crush strength is the force required to break the extrudates which are aligned with the short (1.5 mm) axis parallel to the crushing direction), small length/diameter (L/D) ratio by natural breaking or deliberate chopping such than packed bed bulk densities of at least 0.4 g/cc are achieved. An example of an extrudate that meets these criteria is sample B5E described in Table 2.

A preferred embodiment of the present invention comprises the following steps in the extrusion stage:
(a) select die between 0.5-4.0 mm and preferably between 1.0-2.0 mm and more preferably between 1.0-1.5 mm; and
(b) use low pressure extrusion, where the product from the wet mixing stage is squeezed through the die openings at pressures less than 500 psi and preferably less than 300 psi.

The preferred low-pressure extrusion geometry from a yield and performance standpoint is dome (lower performance or yields were obtained from axial/screw, radial and basket extrusion types-definitions see LCI Technical Bulletin Extrusion & Spheronization Brochure and Extrusion & Spheronization Product Line Flyer). In cases where the extrudates are to be directly spheronized, it is preferred that the surfaces of the extrudate strands are smooth and not fractured. In these cases, the extrudates have sufficient green strength (i.e., the strength prior to drying and calcination) to be spheronized without significant yield losses (where yield refers to fraction of particles in the target size range, in the present case 10×20 mesh). A measure of successful extrusion is that after calcination and any further required processing steps (spheronization excepted) including ion exchange and activation, is that the rate properties of the extrudates are equal to and preferably at least 1.2 times the rate properties of the extruded and spheronized adsorbent of equivalent composition (i.e., $SCRR_{extrudate} \geq SCRR_{bead}$). In the case where the extrudates are to be calcined and used for gas separation without spheronization, it is preferred that the particles are chopped to yield particles with L/D ratios of 3 or less, and preferably 2 or less. For zeolite adsorbents bound with inorganic oxides such as clays, it is preferred that the L/D ratios and particle porosities are such that tapped bulk densities of at least 0.4 g/cc can be achieved. FIG. 1 shows a drying step, which is optional although useful for some formulations.

C. Spheronization

The products from extrusion (still in their green/uncalcined state) are converted to beads by appropriate equipment which, for example, can chop and roll the extrudates so as to round them into a beaded form. The term "beads" or "beaded" in this context is used to mean products that are more spherical (bead-like) compared to the extrudate feed. Depending on the formulation, spheronization process and operating parameters, different degrees of roundness can be achieved. In terms of the high rate adsorbents of the present invention, the shape is less limiting than the ability to load and pack adsorption columns and achieve reasonable dense packing (at least 0.35 g/cc). For the present invention, any equipment capable of chopping and rounding the extruded material may be employed. An example of suitable equipment for chopping and rounding of extrudates is a marumerizer (see, e.g., LCI Technical Bulletin QJ-400TG or QJ-700T). The spheronization process should be operated such that extrudates are converted to beads at a yield of at least 80% and preferably at least 90%. For some recipes, excessive spheronization can be detrimental to the adsorbent performance as well as the product yields from this processing step.

In the case where a marumerizer is used, operating parameters including batch size, rotation speed and processing time need to be optimized on a case by case basis. Higher speeds (e.g., greater than 1000 rpm) and longer times (e.g., greater than 90 seconds) often promote a greater degree of rounding, but not all formulations can be processed this way. Preferred spheronization conditions in cases where a marumerizer is employed are 500-1200 rpm and preferably 1000 rpm for residence times of 15-90 seconds and for preferably 60 seconds or less and more preferably for 30 seconds with optimum loading densities per batch of 0.2-0.5 kg/l. Critical parameters that impact the marumerizer operation include the adsorbent composition and binder, if used, the moisture content, presence of additives and the quality of the extrudate feed. For a given adsorbent, different binders at the same binder content can augment or contract the range of marumerizer speeds and times which can be used. If the extrudate feed is too wet, agglomeration can take place within the marumerizer which will increase the particle size of the product, compared to drier formulations. Additionally, extrudates that are too dry risk attrition inside a marumerizer and yield losses through the generation of fines.

An embodiment of the present invention employs a high moisture content to facilitate the extrusion step and obtain good quality and highly porous extrudates and uses an additional step to dry the surface of the particles prior to marumerizing to prevent excessive agglomeration. The method used to dry the particle surfaces prior to marumerization is not limiting and can be carried out in a number of ways including the use of a dry purge with a suitable gas depending on the composition of the adsorbent.

Another embodiment uses recipes which are compatible with the extrusion and spheronization stages without additional processing steps or aids. For example, dry-back, whereby dry adsorbent powder in quantities up to 5 wt % (dry weight basis) can be used in place of a drying step to prevent agglomeration inside the spheronizer and meet the requirements of yield and particle size distribution. In this way, the products from extrusion can be directly spheronized and, once calcined, produce adsorbents with high rate character.

An example of a preferred embodiment of the present invention comprises spheronization using a marumerizer. The marumerizer should be equipped with either a 2 mm or 3 mm friction plate. For particle sizes in the range 0.5-2.0 mm it is preferred that a 2 mm friction plate is used, and for larger particle sizes above 2.0 mm, a 3 mm friction plate should be employed. The batch size should be kept with the range 0.2-0.5 kg/l (dry weight basis) and marumerized at 1000 rpm for residence times in the range 15-90 seconds and preferably 60 seconds or less and most preferably 30 seconds, such that the products possess greater sphericity than the extrudates from which they were formed and that the particle diameters of the spheronized product are within the range D±30% (wherein D is the diameter of the extrudate which is being spheronized) for yields of at least 80% and more preferably at least 90%. It is preferred that marumerization be carried out without extra processing steps including the optional drying step or without recourse to processing aids or methods such as dry-back.

D. Calcination Stage

Once the extrusion product has been spheronized and the green beaded product harvested, a calcination step should be performed to set any binders, remove any removable components and processing aids if used, and generally to strengthen the agglomerated products. If the desired adsorbent form is a pellet or strand, the extrusion product can be calcinated in the same manner as the beaded product. If processing aids containing organic components have been used, then the purge gas should be air. For other formulations, either air or other inert gases are acceptable. Care must be taken during calcinations to avoid steaming the sample. One method of preventing steaming is staging the temperature rise and using a dry purge gas such as dry air to sweep away moisture. The final temperature should be that which successfully completes the objectives of the calcination process as specified above. The optimum temperatures are material dependent and must be determined by the component materials used. For inorganic adsorbent such as zeolites with clay binders, temperatures approaching or equal to 600° C. are recommended.

E. Additional Processing Steps

Additional processing steps may be required to produce some adsorbent classes. For example, to produce lithium zeolite X compositions (LiX) that are useful for non-cryogenic air separation, an ion exchange step is typically performed using a column based process once beads of the as-synthesized zeolite X have been made and calcined. In accordance with the process of the present invention, LiX zeolites can be made using the steps shown in FIG. 2.

Figure 2:
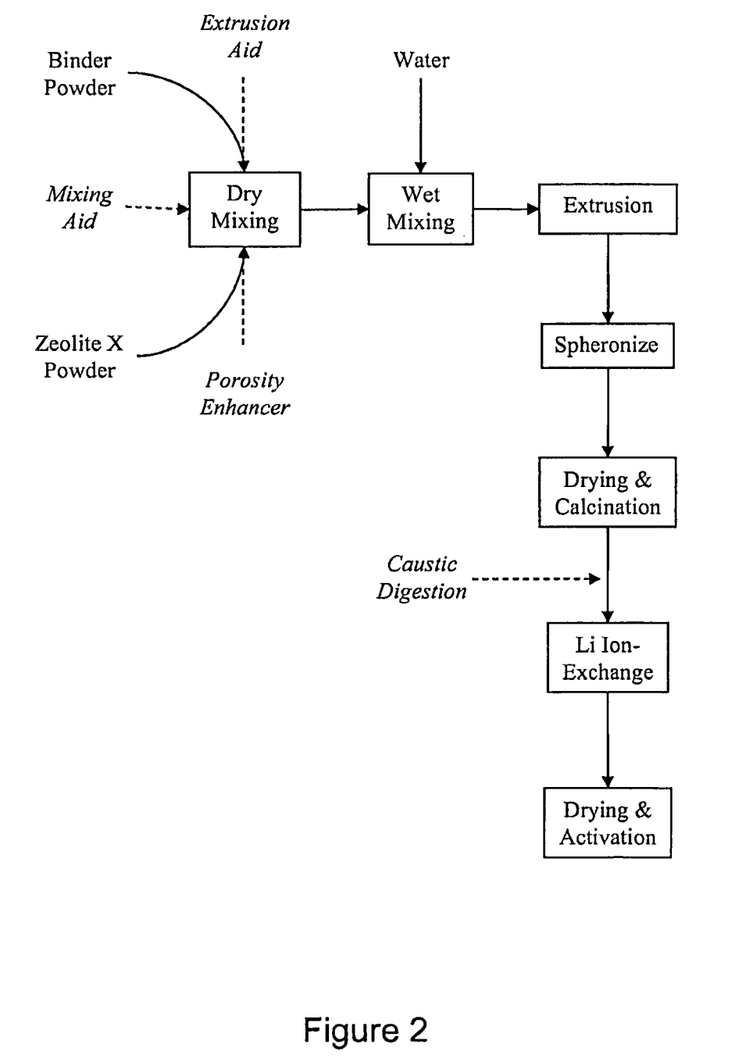
FIG. 2 is a schematic illustrating an example of a manufacturing scheme to produce high rate LiX adsorbents using the process of the present invention.

In the embodiment shown in FIG. 2, the mixing aid, extrusion aid and porosity enhancer are optional and can be added depending on the formulation used. The zeolite X powder is blended with appropriate amounts (5-20 wt %) of a suitable binder (i.e., clays including attapulgite, sepiolite, etc.), before adding water. The water content should be such that an extrudable paste is obtained and varies according to the binder type and quantity, as well as the presence of any additives. As a guide, LOI values for the extrudable paste between 40-50 wt % expressed on a dry basis (i.e., clay+ zeolite powder) are typical. The paste is homogenized adequately in a mixer or kneader before extruding. After harvesting the extrudates, an optional drying step may be introduced prior to spheronizing for some recipes to remove surface moisture and improve the yields and reduce agglomeration which can occur during spheronization (particularly marumerizing), if formulations are too wet and/or sticky. The extrudates at appropriate moisture level are spheronized and subsequently calcined to set the binder and remove combustible additives. The products at this stage are often called "feed beads" and can be converted to their Li-exchanged form using procedures well known by those skilled in the art (see, e.g., U.S. Pat. No. 6,171,370). FIG. 2 also shows a caustic digestion step, which is optional.

The invention is illustrated by the following examples which show firstly how beads of an NaKX2.0 zeolite using different binders can be prepared using the extrusion-spheronization process described herein. Adsorption rate data is presented for these samples to illustrate that the products are high performance materials. The remaining examples are devoted to LiX2.0 zeolites prepared again using the extrusion-spheronization process with the addition of Li exchange and activation steps, which are required to convert the parent zeolite (as synthesized) to its lithium form. Adsorption rate data is obtained for these Li exchanged materials to show that the processing method yields samples with high adsorption rate properties.

Example 1

Preparation of NaKX2.0 Beads (Actigel Binder, LOI=48.3 wt %)

The raw materials for this preparation include zeolite X2.0 as synthesized powder (sometimes referred to as low silica zeolite X or LSX) which was obtained from Zeochem LLC, Acti-Gel 208 (referred herein as Actigel, a purified attapulgite clay binder) from Active Minerals Company LLC, and methylcellulose used as an extrusion aid, product name Methocel K4M from Dow Chemicals. The zeolite X2.0 powder was blended with 10 wt % Actigel and 1.5 wt % methylcellulose in a Hobart N50 mixer for 60 minutes. 500 g of the dry mixed powder having an starting LOI of 16.6 wt % was slowly wetted with 306 g of de-ionized water whilst stirring in the Hobart N50 mixer. A total mixing time of 60 minutes was used for the wet mixing stage. The wet mixed product having an LOI of 48.3 wt % was immediately extruded using a low pressure Multi Granulator (Extruder) in dome geometry from LCI corporation (model no. MG-55) using a 2.0 mm die. A sample of the extrudates was collected (B5E). The remainder was divided in two batches of 250 g (wet weight) and marumerized using a Laboratory Marumerizer (Spheronizer) QJ-230T from LCI Corporation. The QJ-230T was equipped with a dry air supply fed through the sample inlet port to provide some in situ sample drying. The first batch (B5M-1) was marumerized at 750 rpm for 30 seconds before the sample was harvested. The second batch (B5M-2) was marumerized at 1000 rpm for 30 seconds before the sample was harvested. The three samples B5E, B5M-1 and B5M-2 were then calcined to set the binder and remove the methylcellulose additive. A shallow tray calcination method was used in a General Signal Company Blue M Electric oven equipped with a dry air purge. The adsorbents were spread out in stainless steel mesh trays to provide a thin layer less than 0.5 inch deep. A purge of 200 SCFH of dry air was fed to the oven during calcinations. The temperature was set to 90° C. followed by a 360-minute dwell time. The temperature was then increased to 200° C. gradually over the course of a 360-minute period (approximate ramp rate=0.31° C./min), and then further increased to 300° C. over a 120-minute period (approximate ramp rate=0.83° C./min) and finally increased to 593° C. over a 180-minute period (approximate ramp rate=1.63° C./min) and held there for 45 minutes before cooling. The extrudate and beaded products were harvested and subjected to adsorption rate tests, see below.

Example 2

Preparation of NaKX2.0 Beads (Kaolin Binder, LOI=45.8 wt %)

766.0 g of zeolite X2.0 powder from Zeochem LLC was dry mixed with 54.4 g Kaolin (a clay binder) and 19.5 g of methylcellulose. The LOI values for the zeolite X2.0 powder and Kaolin were 15 wt % and 10 wt % respectively. The three components were dry mixed using a Hobart N50 mixer for 60 minutes. After dry mixing, the above components were wetted with 452 g of de-ionized water whilst stirring in the Hobart N50 mixer. A total mixing time of 60 minutes was used for the wet mixing stage. The wet mixed product having an LOI of 45.8 wt % was extruded as above (see Example 1) using the MG-55 granulator from LCI Corporation in dome geometry using a 2.0 mm die. A sample of the extrudates denoted B13E was collected at this stage. The remaining extrudates were divided into 4 batches of 250 g and directly marumerized under the following conditions using the QJ-230T Laboratory Marumerizer (Spheronizer) from LCI corporation, without an air purge through the sample inlet port (see Example 1): B13M-1 marumerizer speed 750 rpm for 300 seconds, B13M-2 marumerizer speed 1000 rpm for 60 seconds, B13M-3 marumerizer speed 900 rpm for 120 seconds and B13M-4 marumerizer speed 1000 rpm for 15 seconds and thereafter 800 rpm for 285 seconds. The beaded products were harvested and calcined following the procedure described in Example 1.

Example 3

Preparation of NaKX2.0 Beads (Actigel Binder, LOI=49 wt %)

The preparation method used the same raw materials and equipment as Example 1 except that the LOI of the paste fed to the dome extruder was 49 wt % (640 g of $H_2O$ was added to 1000 g of dry mixed powder from Example 1 having a starting LOI of 16.6 wt %, thereby creating an extrudable paste with an LOI of 49 wt %), and the extrudates were dried under ambient air conditions for 60 minutes prior to marumerizing a 200 g batch of extrudates at 1000 rpm for 60 seconds. The extrudate sample is denoted B10E and the marumerized sample B10M-1.

Example 4

Preparation of NaKX2.0 Beads (Actigel Binder and PEG Additive, LOI=45.8 wt %)

854.0 g of zeolite X2.0 powder from Zeochem LLC was dry mixed with 101.0 g Actigel (a clay binder, purified grade from Active Minerals Company LLC) and 10.5 g of methylcellulose. The LOI values for the zeolite X2.0 powder and Actigel were 18 wt % and 22.8 wt % respectively. The three components were dry mixed using a Hobart N50 mixer for 60 minutes. 19.3 g of polyethylene glycol 6000 (PEG, from Alfa Aesar) was dissolved in 451 g of de-ionized water and the solution so formed was used to wet the dry mixed components (see above), whilst stirring in the Hobart N50 mixer. A total mixing time of 60 minutes was used for the wet mixing stage. The wet mixed product having an LOI of 45.8 wt % was extruded as above (see Example 1) using the MG-55 granulator from LCI Corporation in dome geometry using a 2.0 mm die. 250.0 g of extrudates were marumerized directly at 1000 rpm for 30 seconds using a QJ-230T Laboratory Marumerizer (Spheronizer) from LCI Corporation, without an air purge through the sample inlet port (see Example 1). The beaded products denoted B70 were harvested and calcined following the procedure described in Example 1.

Example 5

Preparation of NaKX2.0 Beads (Bentonite Binder, LOI=45.1 wt %)

854.0 g of zeolite X2.0 powder from Zeochem LLC was dry mixed with 89.3 g Bentonite (a clay binder, purified grade from Fisher Chemicals) and 10.5 g of methylcellulose. The LOI values for the zeolite X2.0 powder and Bentonite were 18 wt % and 10 wt % respectively. The three components were dry mixed using a Hobart N50 mixer for 60 minutes. 482 g of de-ionized water was used to wet the dry mixed powder whilst stirring in the Hobart N50 mixer. A total mixing time of 60 minutes was used for the wet mixing stage. The wet mixed product having an LOI of 45.1 wt % was extruded as above (see Example 1) using the MG-55 granulator from LCI Corporation in axial geometry using a 2.0 mm die. 250.0 g of extrudates were marumerized directly at 1000 rpm for 30 seconds using a QJ-230T Laboratory Marumerizer (Spheronizer) from LCI Corporation, without an air purge through the sample inlet port (see Example 1). The beaded products denoted B100 were harvested and calcined following the procedure described in Example 1.

Example 6

Adsorption Rate Tests on NaKX2.0 Marumerized Samples

Figure 3:
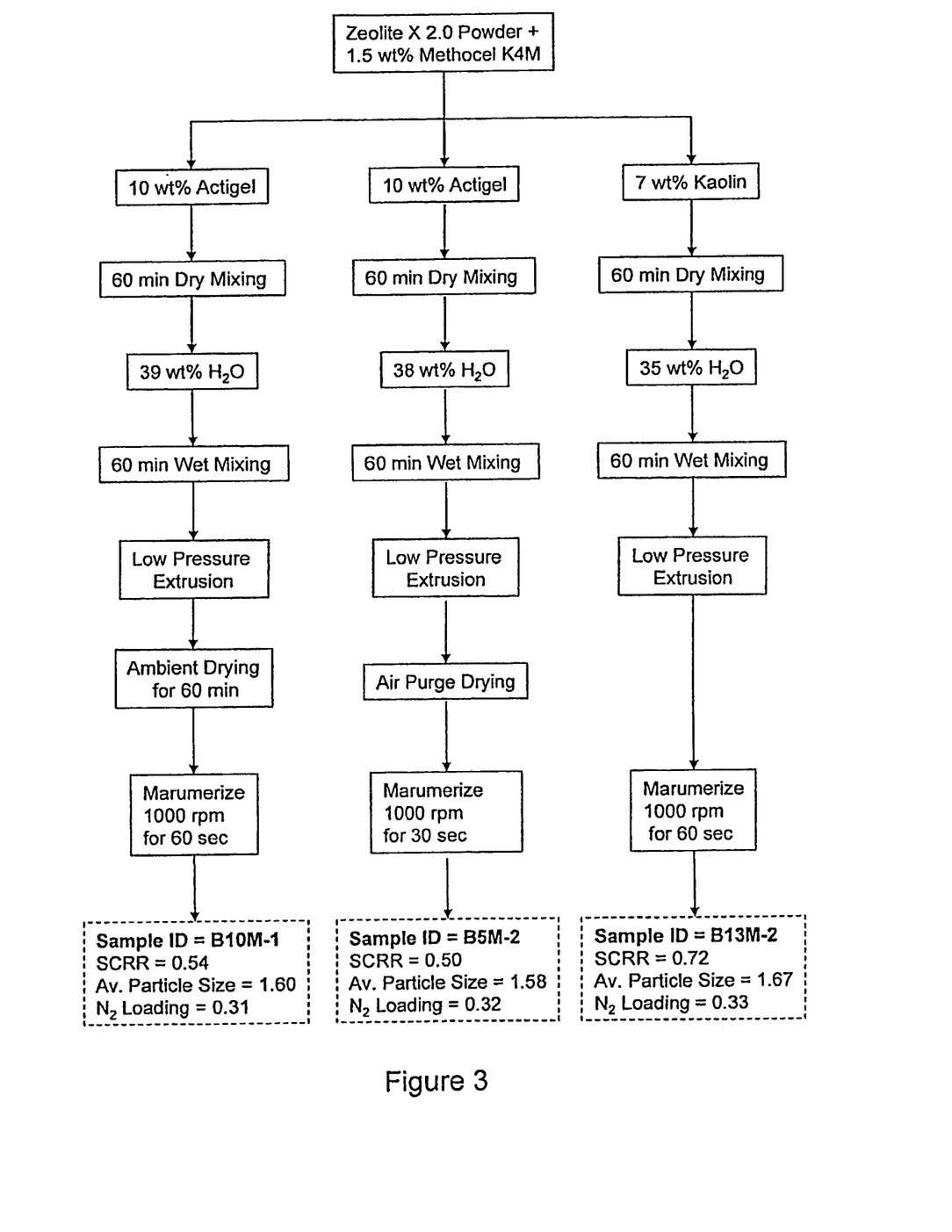
FIG. 3 is a schematic illustrating the sequence of processing steps and conditions for NaKX2.0 zeolite samples prepared according to the procedures described in Examples 1-3, together with selected performance data

The adsorption rate tests were performed using a breakthrough method and associated apparatus. The equipment and test protocol have been described elsewhere (see, e.g., U.S. Pat. No. 6,425,940 and/or U.S. Pat. No. 6,790,260). Prior to adsorption testing, the marumerized samples were screened to 10 by 20 mesh size. The extrudate sample was tested as made without screening. The experimental conditions for the breakthrough test reported in reference U.S. Pat. No. 6,425,940 were used throughout. Pertinent results from the breakthrough test are summarized below in Table 1 and shown together with the agglomeration and processing steps in FIG. 3.

TABLE 1

Adsorption Rate Test Results for Extruded and Marumerized NaKX2.0 Samples

| | | Extrusion/Marumerization Details | | | Adsorption Rate Testing | | | | |
|---|---|---|---|---|---|---|---|---|---|
| Sample ID | Binder Type | [a]Drying Time (min) | [b]M Speed (rpm) | [c]M Time (sec) | [d]Packing Density (g/cc) | [e]Av. Particle Size (mm) | [f]$N_2$ Loading (mmol/g) | [g]RR (mmol/g sec) | SCRR (mmol $mm^2$/g sec) |
| Extrudate | | | | | | | | | |
| B10E | Actigel | — | — | — | 0.49 | 1.72 | 0.28 | 0.21 | 0.61 |
| Extruded and Marumerized Samples | | | | | | | | | |
| B5M-2 | Actigel | Air Purge | 1000 | 30 | 0.55 | 1.58 | 0.32 | 0.20 | 0.50 |
| B10M-1 | Actigel | 60 | 1000 | 60 | 0.57 | 1.60 | 0.31 | 0.21 | 0.54 |
| B13M-2 | Kaolin | — | 1000 | 60 | 0.53 | 1.67 | 0.33 | 0.26 | 0.72 |

[a]Drying time refers to time spent air drying under ambient conditions. For sample B5M-2 a dry air purge was used whilst marumerizing (see Example 1).
[b]M Speed refers to marumerizer operating speed.
[c]M Time refers to marumerizer operating time.
[d]Packing density is obtained by densely packing a tube (i.d. = 9.5 mm) having a total volume of 20 $cm^3$ with particles of each sample.
[e]Average particle size is determined by screen analysis method.
[f]$N_2$ loading is obtained from analysis of the breakthrough data see references U.S. Pat. No. 6,425,940 and/or U.S. Pat. No. 6,790,260 for details. It is the amount of nitrogen stored by a 20 $cm^3$ densely packed bed of material.
[g]RR refers to Relative Rate as defined in Equation 2 of U.S. Pat. No. 6,425,940.

Example 7

Preparation of Lithium Ion Exchanged Zeolite X2.0 Extruded and Marumerized Samples Lithium ion exchange was performed on samples B5E, B5M-1, B5M-2 from Example 1 and B10M-1 from Example 3. A column ion exchange process was used where the samples are packed inside a glass column (dimensions: 3-inch i.d.) contacted with lithium chloride solution (1.0 M) at 90° C. at a flow rate of 15 ml/min. A preheating zone before the adsorbent packed column, ensures the solution temperature has reached the target value prior to contacting the zeolite samples. A 12-fold excess of solution was contacted with the samples to yield products with Li contents of at least 96% exchange and above. After the required amount of solution is pumped through the column containing the samples, the feed is switched to de-ionized water to remove excess LiCl from the samples. A water volume of 30 L and flow rate of 120 ml/min was used. An AgNO₃ test, familiar to those skilled in the art, was used to verify that the effluent was essentially chloride free, at the end of the washing stage. The wet samples were dried and activated under dry $N_2$ purge (flow rate 200 SCFH) using the shallow tray activation method described in Example 1 in a General Signal Company Blue M electric oven. The adsorbents were spread out in stainless steel mesh trays to provide a thin layer less than 0.5 inch deep. The temperature was set to 90° C. followed by a 360-minute dwell time. The temperature was then increased to 200° C. gradually over the course of a 360-minute period (approximate ramp rate=0.31° C./min), and then further increased to 300° C. over a 120 minute period (approximate ramp rate=0.83° C./min) and finally increased to 593° C. over a 180 minute period (approximate ramp rate=1.63° C./min) and held there for 45 minutes before cooling. The extrudate and beaded products were harvested and subjected to adsorption rate tests see Example 6.

Example 8

Adsorption Rate Tests on LiX2.0 Marumerized Samples

Figure 4:
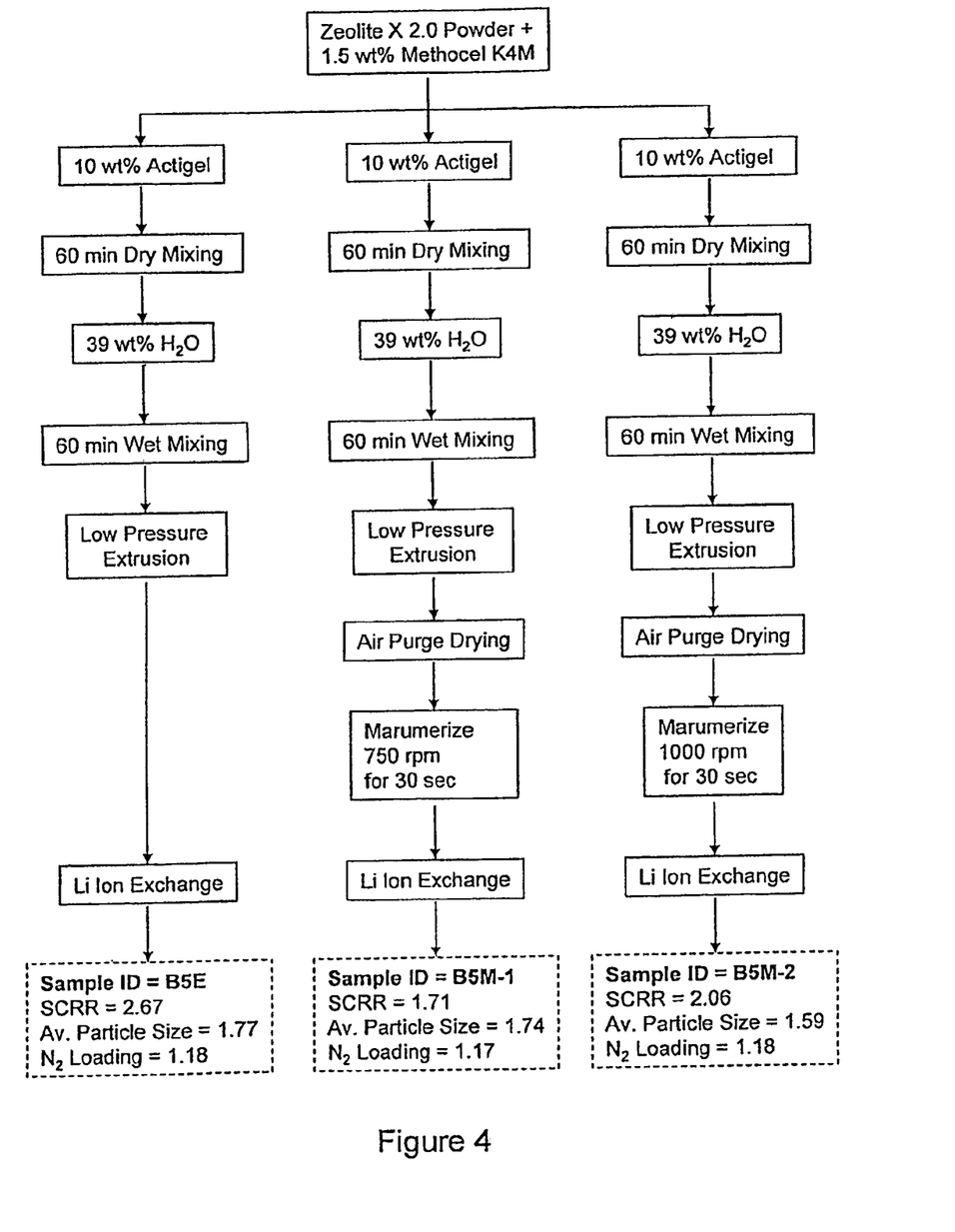
FIG. 4 is a schematic illustrating the sequence of processing steps and conditions for LiX2.0 zeolite samples prepared according to the procedure described in Example 7, together with selected performance data.

The adsorption rate tests were performed using the same equipment, protocol and conditions as in Example 6 and references U.S. Pat. No. 6,425,940 and/or U.S. Pat. No. 6,790,260. Pertinent results from the breakthrough test are summarized below in Table 2 and together with the agglomeration and processing steps in FIG. 4.

TABLE 2

Adsorption Rate Test Results for Extruded and Marumerized LiX2.0 Samples

| | | Extrusion/Marumerization Details | | | Adsorption Rate Testing and Properties of the Adsorbents | | | | | | |
|---|---|---|---|---|---|---|---|---|---|---|---|
| Sample ID | Binder Type | [a]Drying Time (min) | [b]M Speed (rpm) | [c]M Time (sec) | [d]Packing Density (g/cc) | [e]Av. Particle Size (mm) | [f]$N_2$ Loading (mmol/g) | [g]RR (mmol/ g sec) | SCRR (mmol mm²/ g sec) | [h]Porosity (%) | [i]Crush Strength (lbf) |
| Extrudate | | | | | | | | | | | |
| B5E | Actigel | — | — | — | 0.44 | 1.77 | 1.18 | 0.85 | 2.67 | 52.86 | 0.76 |
| Extruded and Marumerized Samples | | | | | | | | | | | |
| B5M-1 | Actigel | Air Purge | 750 | 30 | 0.51 | 1.74 | 1.17 | 0.56 | 1.71 | 48.08 | 0.94 |
| B5M-2 | Actigel | 60 | 1000 | 30 | 0.50 | 1.59 | 1.18 | 0.81 | 2.06 | 48.93 | 1.61 |
| B10M-1 | Actigel | — | 1000 | 60 | 0.54 | 1.52 | 1.17 | 0.73 | 1.69 | 46.39 | 1.37 |
| B100 | Bentonite | — | 1000 | 30 | 0.57 | 1.66 | 1.10 | 0.40 | 1.09 | — | 2.09 |

[a]Drying time refers to time spent air drying under ambient conditions. For sample B5M-2 a dry air purge was used whilst marumerizing (see Example 1).
[b]M Speed refers to marumerizer operating speed.
[c]M Time refers to marumerizer operating time.
[d]Packing density is obtained by densely packing a tube (i.d. = 9.5 mm) having a total volume of 20 cm³ with particles of each sample.
[e]Average particle size is determined by screen analysis method.
[f]$N_2$ loading is obtained from analysis of the breakthrough data see references U.S. Pat. No. 6,425,940 and/or U.S. Pat. No. 6,790,260 for details. It is the amount of nitrogen stored by a 20 cm³ densely packed bed of material.
[g]RR refers to Relative Rate as defined in Equation 2 of U.S. Pat. No. 6,425,940.
[h]Porosity (%) is determined by Hg porosimetry technique using a Micrometrics AutoPore III 9420 porosimeter.
[i]Crush strength is the maximum load required to rupture a single particle. The value reported here represents the average crush strength of 25 particles with mesh size 12 × 14 measured using a Lloyd LRX instrument For the zeolite adsorbents discussed in the examples, there was a change in porosity and pore size distribution as measured by Hg porosimetry and SEM imaging of cross sections of particles going from extrudate to bead. The manufacturing method of the present invention offers adsorbents with two different pore structures and porosities (i.e., adsorbents wherein porosity and pore size distribution are changed between extrudate and spheronized product). Porosity data is presented in Table 2 showing how the extrudate has greater porosity than the corresponding bead made by spheronization thereof. Referring to Table 2, the Hg porosimetry data show that the adsorbents made in the above examples are highly porous compared to the advanced adsorbents described in U.S. Pat. No. 6,425,940 where adsorbents with a porosity between 23% and 40% (as measured by Hg porosimetry) were claimed. The high porosity of both the extrudates and the extruded and marumerized particles is consistent with their high rate characteristics (SCRR values for lithium exchanged zeolite X samples greater than 1.2 mmol-mm²/g-sec (see U.S. Pat. No. 6,425,940)). The extrudate sample B5E showed the highest adsorption rate (SCRR=2.67) whereas samples which were marumerized thereafter showed a reduction in rate compared to the extrudates. Whilst it is desirable to minimize the amount of reduction in adsorption rate which occurs during spheronization and subsequent processing, the crush strength data shows that marumerization increases the strength of the particles.

Figure 5:
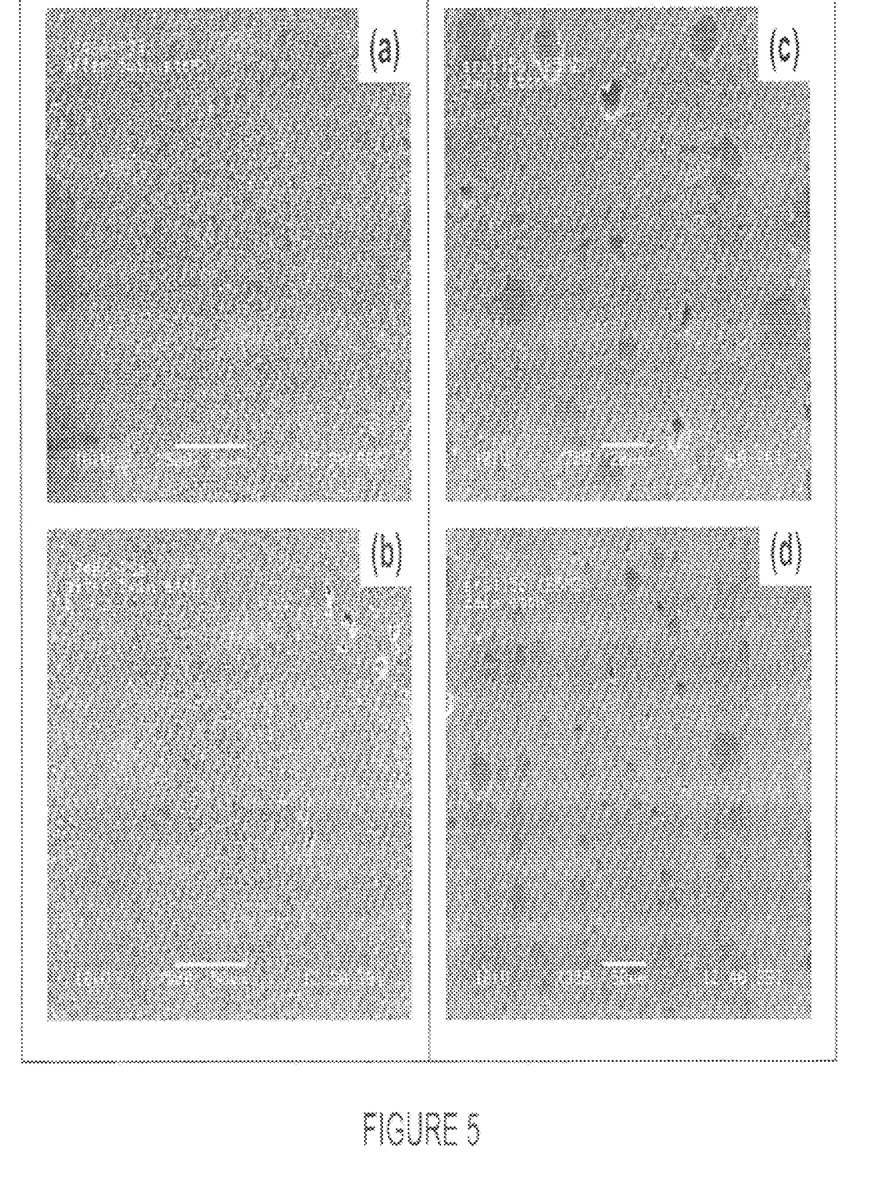
FIGS. 5(a) and 5(b) are SEM images of cross-sections of extrudate B5E.
FIGS. 5(c) and 5(d) are SEM images of cross-sections of beaded sample B5M-2.

FIGS. 5(a)-(d) are SEM images of cross sections of extrudate and beads made with Actigel clay binder (10 wt % on dry basis) where there is an appearance of holes of approximate size 5-25 microns in the spheronized product (B5M-2, FIGS. 5(c) and 5(d)), but not in the extrudate (B5E, FIGS. 5(a) and 5(b)). This surprising result shows that spheronization does more in some cases than simply turn extrudates into beads and in this case has introduced a novel "Swiss cheese" like structure to the bead. Adsorbents in the prior art typically have macropores of less than 5 microns. The term "Swiss cheese" structure in this case refers to the introduction randomly of discrete spherical holes or macropores of approximately 5-50 microns in diameter into and throughout the bead of adsorbent.

Figure 6:
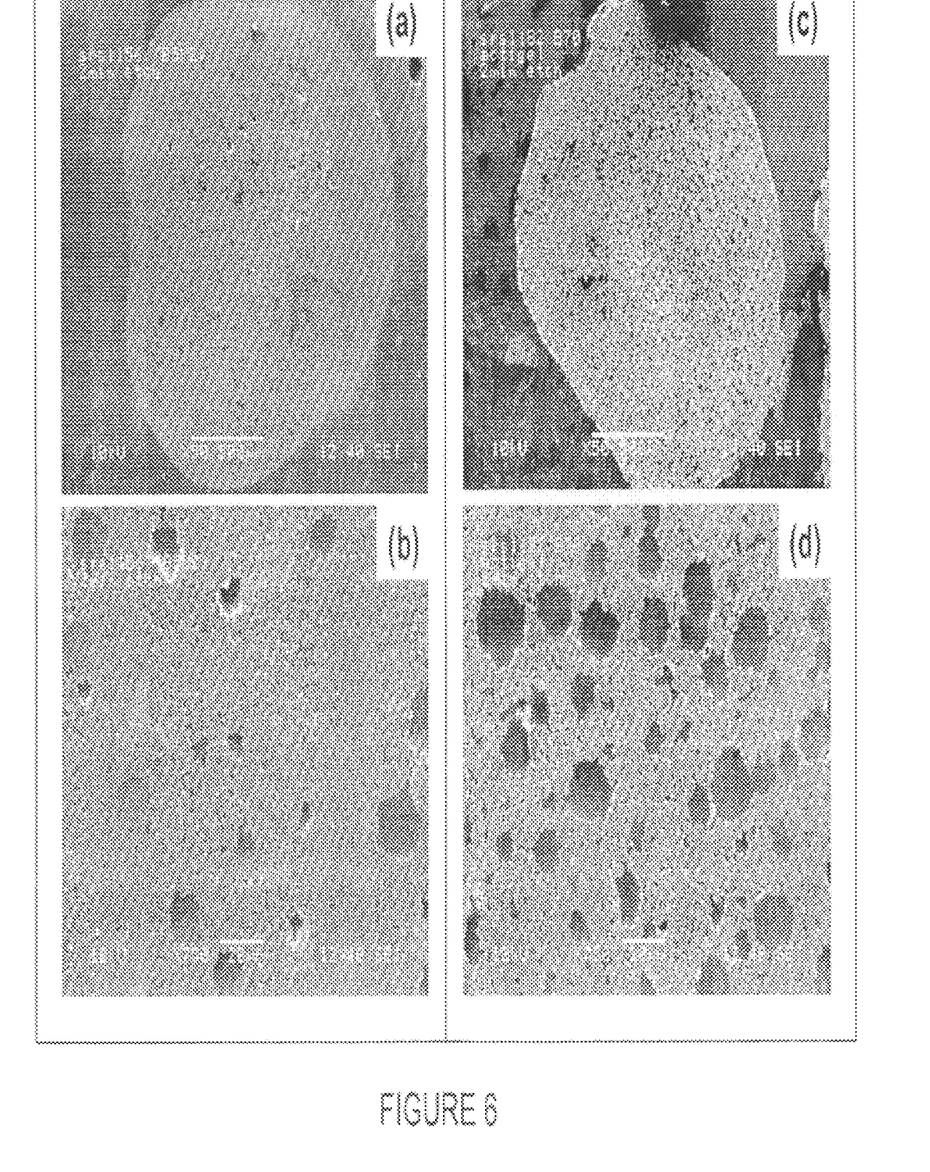
FIGS. 6(a) and 6(b) are SEM images of cross-sections of beaded sample B5M-2.
FIGS. 6(c) and 6(d) are SEM images of cross-sections of beaded sample B70.
Figure 7:
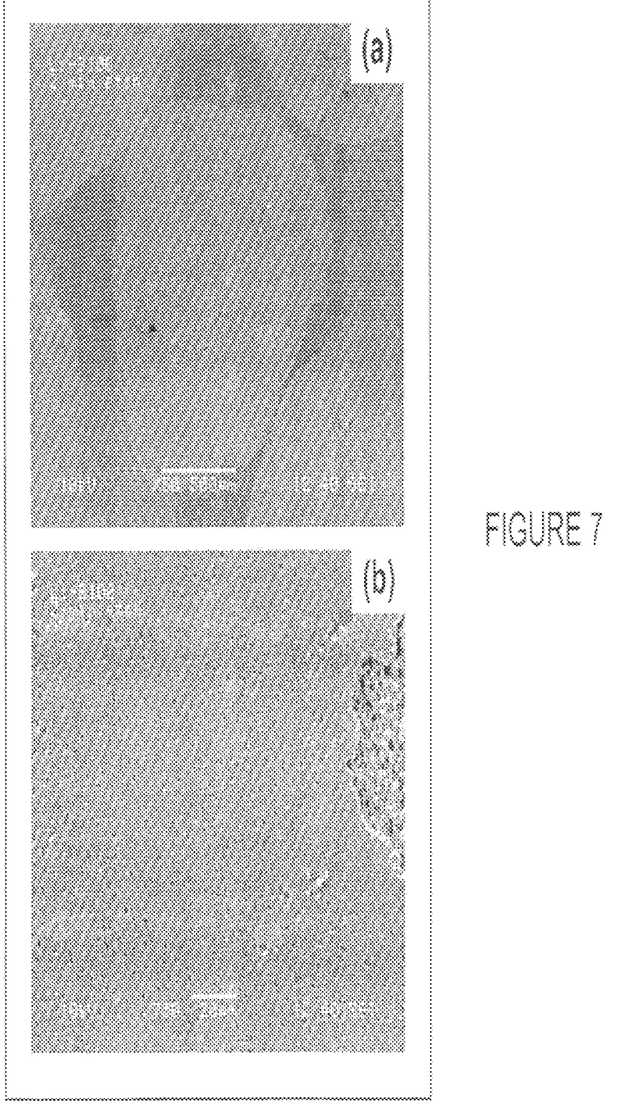

Comparison of the adsorbents of the present invention to adsorbents of the prior art (see e.g., U.S. Pat. No. 6,425,940 where SEM images of adsorbent cross sections prepared using the same method can be compared with the adsorbents of the present invention) shows that this "Swiss cheese" structure is novel and has not been previously incorporated into beaded adsorbent of the type described herein. The amount of "Swiss cheese" holes can be augmented by manipulation of the basic recipe and particularly through the use of additives. For example, SEM images of an LiX2.0 sample B5M-2 (see FIGS. 6(a) and 6(b)) prepared with Actigel clay binder and methylcellulose is compared to an LiX2.0 sample B-70 (see FIGS. 6(c) and 6(d)) prepared with Actigel clay binder, methylcellulose and 2 wt % polyethylene glycol. The B70 sample shows a significant increase in the density of "Swiss cheese" holes. It is possible that the strength of the binder-adsorbent interaction governs whether or not "Swiss cheese" holes form, and the extent to which this happens. For example, in experiments with Bentonite clay, which is more plate-like compared with fibrous Actigel (attapulgite), beads produced with 10 wt % Bentonite (sample B100) showed an absence of "Swiss cheese" holes in SEM images of bead cross sections (see FIGS. 7(a) and 7(b)). As shown in Table 2, although B100 provides high crush strength, it does not provide a SCRR greater than 1.2 mmol-mm$^2$/g-sec.

High crush strength is advantageous, if not a requirement, for many commercial applications including packed bed adsorption processes. It is plausible that the impacts and collisions (particle-particle and particle-marumerizer wall/friction plate) which occur during marumerization serve to increase the density of particles which in turn results in higher crush strength. It is also possible that the marumerizer operation increases the density of the particle surface region more than the bulk, effectively creating a skin layer which augments the particle strength. Such a core-shell particle would offer most of the high rate advantages of the extrudate by virtue of a similar pore structure in the core region, combined with better crush strength as a result of the denser shell (or skin). Both of these interpretations are at least consistent with the data presented in Table 2. The extruded and marumerized samples (see Table 2) therefore represent a compromise between high rate and crush strength properties. The extent of the compromise will be dependent on both the formulation and processing conditions employed.

Comparing the SCRR values in Table 2 with the advanced PSA adsorbents disclosed in U.S. Pat. No. 6,425,940 where LiX zeolites are prepared by conventional bead forming and subsequent caustic digestion methods, the adsorbents of the present invention exceed the SCRR value of 1.2 which is shown to be an improvement over the prior art. Despite the fact that the adsorbents of the present invention possess a binder content of 10 wt %, these compare very favorably with the essentially binderless materials from U.S. Pat. No. 6,425,940 prepared by the caustic digestion route. Mercury porosimetry results indicate B5M-2 to have 48.93% porosity and 0.39 micrometer median pore diameter.

U.S. Pat. No. 6,790,260 (Ackley et al.) describes in paragraph [0059] an LiX2.0 adsorbent made by conventional methods containing a clay binder. This adsorption rate of this sample, denoted R-1, was characterized using an identical breakthrough system and method to the adsorbents described herein prepared by extrusion-spheronization. The performance of sample R-1 is expressed in terms of mass transfer coefficient (MTC). This analysis was performed for sample B5M-2 prepared as described in Example 2 and ion exchanged using the procedure in Example 5. The results are presented below in Table 3. The mass transfer coefficient is determined following the procedure described in U.S. Pat. No. 6,790,260. Sample B5M-2 is an LiX2.0 adsorbent prepared by extrusion-spheronization with a clay binder.

TABLE 3

Results of Mass Transfer Coefficient Analysis for Sample B5M-2 and Reference Sample R-1 from U.S. Pat. No. 6,790,260

| Sample | Preparation Method | Form | Type | Av. Particle Size (mm)$^2$ | Porosity (%)$^3$ | MTC$_{N2}$ (s$^{-1}$)$^4$ |
| --- | --- | --- | --- | --- | --- | --- |
| R-1 | Traditional | Bead | LiX2.0 | 1.6 | 33 | 11 |
| B5M-2 | E-S$^1$ | Bead | LiX2.0 | 1.6 | 49 | 19 |

$^1$Where E-S denotes the extrusion-spheronization process described herein.
$^2$Average particle size is determined by screen analysis method.
$^3$Porosity (%) is determined by Hg porosimetry technique using a Micrometrics Auto Pore III 9420 porosimeter.
$^4$MTC$_{N2}$ is the mass transfer coefficient determined using the procedure described in U.S. Pat. No. 6,790,260 at a pressure of 1.5 bar and a temperature of 300° K.

The results of the mass transfer coefficient (MTC) analysis show that the LiX2.0 adsorbent B5M-2 has a higher MTC than the corresponding sample made by traditional bead making technology. As described in U.S. Pat. No. 6,790,260, adsorbents with MTC$_{N2}$ greater than or equal to 12 are desirable for gas separation by adsorption processes.

In the Sawyer/Robson patents, it is clear that the improvements taught in the disclosure are obtained from the use of the hydrogel/polymer components as opposed to the extrusion and marumerization processing applied at a latter stage in the manufacturing scheme to agglomerate the products for application.

In the present invention, for adsorbent preparation, the use of extrusion, especially low pressure extrusion, alone or combined with spheronization is a critical component of the claimed improvement in adsorption rates. Without wishing to be constrained to any theories, it is believed that the agglomeration techniques taught herein produce adsorbent particles with novel pore size distributions and porosity compared to conventional pan-pelletization with the same recipe (zeolite type, binder type and content). These porosity and pore structure improvements do not involve the use of hydrogels and/or rely on the addition of polymeric pore extenders as in U.S. Pat. No. 4,016,106. It is a further objective of the current invention to teach that the fine details of the agglomeration processing, including extrusion and marumerizer/spheronizer operating parameters, have a significant impact on the adsorption rate properties of the adsorbent particles produced therefrom (and correspondingly on the porosity and pore structure of the shaped adsorbent particle), and that these need to be optimized jointly with the adsorbent formulation itself. Such teachings are absent from the aforementioned patents. In U.S. Pat. No. 4,016,106, Sawyer et al. have focused instead on producing "high quality spheres" by marumerizing for comparatively long times (10-12 minutes at 970 rpm) before undertaking an additional smoothing step which involves marumerizing with a different friction plate for extra time. In the context of the present invention, high sphericity is less important than high adsorption rates. We have found, working at a similar scale, that long marumerization times such as those above, tend to lower the porosity of the adsorbent particles and negatively impact the adsorption rates.

The adsorbents of the present invention were formed by a different agglomeration scheme than U.S. Pat. No. 6,171,370 (Hirano et al.) which can provide the shaped product with a novel macropore structure in terms of both size distribution and tortuosity compared to conventional bead-forming processes, including blade agitation granulation. The evidence for this comes from measurements of the porosity of the novel beaded products which shows them to be more porous than products from conventional bead forming using the same formulation. In addition, adsorption rate tests have been performed to teach which formulations and processing conditions give the highest rates.

As distinguished from U.S. Pat. No. 4,316,819 (Tu et al.), the present invention teaches a method of producing extruded materials with high mass transfer characteristics and uses spheronization techniques to break up the extrudates and round off their edges so as to increase their strength and attrition resistance, yet retain as much of the high rate character of the extrudates as possible. To achieve this, the agglomeration processing parameters and the formulation details must be adjusted so as to achieve an optimum in terms of the performance of the particles and their strength. Typically, this involves, minimizing the duration and intensity of the spheronization step so as to preserve the porosity and rate characteristics of the shaped particles, often at the expense of particle sphericity.

In summary, high rate gas separation adsorbents as well as their method of manufacturing are disclosed. The method comprises components mixing, extrusion preferably at low pressure, optional spheronization, drying and calcination, and optional ion exchange and subsequent activation. Relative to adsorbents disclosed in U.S. Pat. No. 6,425,940, the high rate gas separation adsorbents are not subjected to caustic digestion, have high porosity, contain a higher fraction of the binder in the product, and have improved relative rate (RR), as well as size compensated relative rate (SCRR). These adsorbents can be used in VPSA, PSA, and TSA processes.

Alternative ways to practice the invention include the preparation of other classes of adsorbent and/or catalysts using the steps of component mixing, extrusion and spheronization. Pertinent adsorbents and/or catalysts include:

Other synthetic zeolites: including but not limited to faujasitic structures (i.e., Zeolites types X and Y), Zeolite A, Zeolite L, Zeolite P, Chabazite, Beta, Ferrierite, ZSM-5, and Mordenite Ion exchanged or impregnated zeolites whereby the ion exchange and or impregnation steps are added to the basic manufacturing scheme, as illustrated in Example 7 for the case of Li exchanged zeolite X.

Aluminas and/or silicas including mesoporous variants

Other inorganic oxides porous or non porous including, but not limited to impregnated or supported variants Organo-metallic framework structures including, but not limited to MOF's Polymeric adsorbents Mixtures of the above (i.e., zeolite-alumina composites)

Although the invention has been described in detail with reference to certain preferred embodiments, those skilled in the art will recognize that these are other embodiments within the spirit and the scope of the claims.

What is claimed is:

1. A process for making a high mass transfer rate LiX adsorbent for gas separation comprising the steps of:
    (a) dry mixing a type X zeolite powder, a binder materials and, optionally, one or more additive materials;
    (b) adding a fluid to the dry-mixed materials to form an extrudable paste;
    (c) extruding the paste at pressures less than 500 psi to form pellets or strands of adsorbent;
    (d) spheronizing the pellets or strands to form beads of adsorbent;
    (e) calcinizing the adsorbent beads; and
    (f) performing a lithium ion exchange to form a LiX adsorbent bead;
wherein the resulting extruded pellets or strands of step (c) and the spheronized beads of step (d) have a specific size-compensated relative rate (SCRR) greater than 1.2 mmol-mm2/g-sec and porosity in the range of 45-53%.

2. The process of claim 1, wherein the binder material comprises attapulgite clay.

3. The process of claim 2 wherein the optional one or more additive materials is added in step (a) and the additive is methylcellulose.

4. The process of claim 3, wherein the fluid added in step (b) is water.

5. The process of claim 4 wherein the extrusion in step (c) is performed at a pressure less than 300 psi.

6. The process of claim 5 wherein the water content of the extrudable paste in the range of 40-52 wt %, as determined by loss on ignition at 1000° C.

7. The process of claim 5 wherein the dry mixing is carried out for 15 to 30 minutes.

8. The process of claim 6 wherein the extrusion of step (c) forms pellets or strands of adsorbent having a diameter in the range of 1.0 to 1.5 mm.

9. The process of claim 8 wherein the spheronization of step (d) is carried out in a marumerizer at 750 to 1000 rpm for less than 60 seconds.

10. The process of claim 1 wherein the X zeolite power is a LiX2.0.

11. The process of claim 1 wherein the calcinizing of (e) occurs at temperatures approaching or equal to 600° C.

12. The process of claim 1 wherein the X zeolite power is a NaKX2.0.

* * * * *